United States Patent
Suemitsu et al.

(10) Patent No.: US 8,971,342 B2
(45) Date of Patent: Mar. 3, 2015

(54) SWITCH AND FLOW TABLE CONTROLLING METHOD

(75) Inventors: Mariko Suemitsu, Tokyo (JP); Masanori Takashima, Tokyo (JP); Ken Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 201 days.

(21) Appl. No.: 13/642,106

(22) PCT Filed: Apr. 12, 2011

(86) PCT No.: PCT/JP2011/059086
§ 371 (c)(1),
(2), (4) Date: Dec. 12, 2012

(87) PCT Pub. No.: WO2011/132568
PCT Pub. Date: Oct. 27, 2011

(65) Prior Publication Data
US 2013/0114615 A1     May 9, 2013

(30) Foreign Application Priority Data
Apr. 19, 2010  (JP) .................................. 2010-095760

(51) Int. Cl.
*H04L 12/28* (2006.01)
*H04L 12/755* (2013.01)
(Continued)

(52) U.S. Cl.
CPC .......... *H04L 45/021* (2013.01); *H04L 47/2441* (2013.01); *H04L 49/254* (2013.01); *H04L 49/557* (2013.01); *H04L 45/38* (2013.01)
USPC ........................................................ 370/401

(58) Field of Classification Search
CPC ................................ H04L 45/021; H04L 45/38
See application file for complete search history.

(56) References Cited

U.S. PATENT DOCUMENTS 6,650,640 B1   11/2003  Muller et al.
6,654,343 B1   11/2003  Brandis et al.
(Continued)

FOREIGN PATENT DOCUMENTS

AU        2003244050 A1    5/2003
CN           1466391 A     1/2004
(Continued)

OTHER PUBLICATIONS

European Search Report dated Nov. 7, 2013.
(Continued)

*Primary Examiner* — Huy D Vu
*Assistant Examiner* — Kevin Cunningham
(74) *Attorney, Agent, or Firm* — McGinn IP Law Group, PLLC

(57) ABSTRACT

In an open flow system, it is made possible to confirm a flow having succeeded or failed in the registration on a flow table. Specifically, a controller transmits and receives an open flow message to and from a switch. The switch is provided with a flow table which manages flows registered from a controller, and a flow table reading section which reads corresponding data, a flow table control section which performs processing of addition, deletion and modification of a flow entry, and a platform function managing section which determine whether an object flow entry is valid or invalid according to an inquiry from the flow table control section. The flow table has a normal flow table and a save flow table. A valid flow entry which conforms to configuration data of the switch is registered on the normal flow table. An invalid flow entry which does not conform to the configuration data of the switch is registered on the save flow table.

8 Claims, 8 Drawing Sheets

(51) Int. Cl.
*H04L 12/851* (2013.01)
*H04L 12/937* (2013.01)
*H04L 12/939* (2013.01)
*H04L 12/721* (2013.01)

(56) References Cited

U.S. PATENT DOCUMENTS

| | | | |
|---|---|---|---|
| 7,933,201 B2 | 4/2011 | Tamai | |
| 8,228,789 B2 | 7/2012 | Tanuma | |
| 2004/0103210 A1 | 5/2004 | Fujii et al. | |
| 2005/0148332 A1* | 7/2005 | Buckley et al. | 455/435.2 |
| 2006/0206656 A1* | 9/2006 | Di Benedetto et al. | 710/316 |
| 2007/0058669 A1 | 3/2007 | Hoffmann et al. | |
| 2008/0120286 A1* | 5/2008 | Dettinger et al. | 707/5 |
| 2008/0159293 A1 | 7/2008 | Tamai | |
| 2009/0303874 A1 | 12/2009 | Tanuma | |

FOREIGN PATENT DOCUMENTS

| | | |
|---|---|---|
| EP | 1 195 956 A2 | 4/2002 |
| JP | 2004-056340 A | 2/2004 |
| JP | 2004-173136 A | 6/2004 |
| JP | 2006-254134 A | 9/2006 |
| JP | 2008-167340 A | 7/2008 |
| JP | 2008-177806 A | 7/2008 |
| JP | 2009-049592 A | 3/2009 |
| JP | 2009-296230 A | 12/2009 |
| WO | WO 2009/042919 A2 | 4/2009 |

OTHER PUBLICATIONS

Nick McKeown et al., "OpenFlow: Enabling Innovation in Campus Networks", Mar. 14, 2008, p. 1-6, XP055002028 (http://www.openflow.org/documents/open flowwp-latest.pdf retrieved on Jul. 5, 2011).

OpenFlow Switch Specification Version 1.0.0 (Wire Protocol 0x01), Dec. 31, 2009, p. 1-42, XP055076273, (http://archive.openflow.org/documents/openflow-spec-v1.0.0.pdf retrieved on Oct. 30, 2013).

Chinese Office Action dated Jul. 2, 2014 with a partial English translation thereof.

Taiwanese Office Action dated Apr. 24, 2014, with English translation.

Desai, M.; Nandagopal, T., "Coping with link failures in centralized control plane architectures," Communication Systems and Networks (COMSNETS), 2010 Second International Conference on , vol., No., pp. 1,10, Jan. 5-9, 2010.

Das, S.; Parulkar, G.; McKeown, N., "Unifying Packet and Circuit Switched Networks," GLOBECOM Workshops, 2009 IEEE, vol., No., pp. 1,6, Nov. 30, 2009-Dec. 4, 2009.

International Search Report in PCT/JP2011/059086 dated Jul. 19, 2011 (English Translation Thereof).

Openflow switch Specification Version 0.9.0 (Wire Protocol 0x98) Jul. 20, 2009 Current Maintainer: Brandon Heller (brandonh@stanford.edu) [online] (http://www.openflow.org/documents/openflow-spec-v0.9.0.pdf).

* cited by examiner

SWITCH AND FLOW TABLE CONTROLLING METHOD

TECHNICAL FIELD

The present invention is related to a switch, and more particularly to a switch in an open flow system.

BACKGROUND ART

In a conventional network system, a single switch performed a routing control and a packet transfer.

Recent years, because of virtualization of a network, an open flow (Openflow) system is proposed in which the routing control and the packet transfer of the switch are separated and the routing control is collected in a controller outside the switch (Non-Patent Literature 1).

In the open flow system, the controller monitors the switch in the network and dynamically sets a transmission route of packets to the switches in the network according to the communication situation. The controller registers a flow on the switch by using an open flow protocol (Openflow Protocol) message to generate a flow table.

The flow defines predetermined processing (action) to be done to the packets which conforms to a predetermined rule (rule). The rule of the flow is defined by various combinations of any or all of a destination address, a source address, a destination port, and a source port, which are contained in a header region of a frame which carries the packet, and the rule can be identified. It should be noted that it is supposed that it contains MAC address (Media Access Control Address) and IP address (Internet Protocol Address) in the above-mentioned addresses. Also, the data of input port (Ingress Port) in addition to the above, is practicable as the rule of the flow.

The flow table stores data of the flow (flow entry) every switch.

In the open flow system, the switch carries out the packet transfer according to the generated flow table. The switch needs to confirm whether the flow conforms to a platform function of the switch, before registering of the flow received from the controller on the flow in response to an open flow protocol message table. The switch determines that the conformed flow is a valid flow and an un-conformed flow is an invalid flow, and registers the valid flow on the flow table.

The controller and switch of the open flow system are sometimes called an open flow controller (Openflow controller) and an open flow switch (Openflow switch) respectively.

In the open flow protocol, a flow modification (Flow Mod) message is used for generation of a flow table, but a response message indicating whether or not the generation of a flow entry is succeeded is not defined. Therefore, in order to confirm by the controller whether or not a flow entry has been registered, it is necessary to compare the flow data required in the registration and the flow data acquired in a statistics request (Statistics Request) message.

Also, when an open flow system is introduced into the existing network, there is a possibility that a mismatch with the existing function occurs.

Also, in the open flow protocol, a response message to notify the result to the controller is not defined in the flow modification (Flow Mod) message to carry out a flow setting from the controller to the switch. Therefore, in order to know the setting result by the controller, it is necessary to confirm by using a statistics request (Statistics Request) message.

Generally, in the open flow system, the flow table in the switch retains only the entries of valid flows and does not retain any entry of an invalid flow.

Therefore, there is a problem that the controller cannot determine whether or not the flow to be registered on the flow table in the switch could be actually registered, whether or not the flow could not be registered due to the invalid flow, or whether or not the registration is failed due to another factor.

It should be noted that Patent Literature 1 (JP 2004-056340A) discloses that an L3 switch having a flow table.

Also, Patent Literature 2 (JP 2006-254134A) discloses that flow identification data is outputted when there is a flow entry conforming to a search condition, and addition/deletion of the flow entry to/from the flow table is carried out when there is not the flow entry conforming thereto.

Also, Patent Literature 3 (JP 2008-167340A) discloses a technique that a packet relay unit is provided with a flow table in which the pattern of a packet as an object of the flow identification is described.

Also, Patent Literature 4 (JP 2009-049592A) discloses a technique that a search key and each of flow entries registered on the flow table are compared each time an IP packet is received, and that the statistic data such as the number of times of matching and a total packet length for the matching flow entry are updated.

CITATION LIST

[Patent Literature 1] JP 2004-056340A
[Patent Literature 2] JP 2006-254134A
[Patent Literature 3] JP 2008-167340A
[Patent Literature 4] JP 2009-049592A Non-Patent Literature 1

Openflow switch Specification Version 0.9.0 (Wire Protocol 0x98) Jul. 20, 2009 Current Maintainer: Brandon Heller (brandonh@stanford.edu) [online] (http://www.openflowtheswitch.org/documents/openflow-spec-v0.9.0.pdf)

SUMMARY OF THE INVENTION

An object of the present invention is to provide an open flow system which retains a flow entry which does not conform to a predetermined function, as an invalid entry.

A switch of the present invention, in which a flow entry with a rule and processing (action) defined to uniformly control packets as a flow is registered on a flow table of the switch, is provided with means for confirming whether or not a flow notified from a controller conforms with a predetermined function and determining whether or not the flow is valid or invalid; means for registering a valid flow on a normal flow table; means for registering an invalid flow on a save flow table; and means for recognizing a packet received from a network as a flow and performing processing specified to the flow to the packet when the flow is registered on the normal flow table.

A flow table controlling method by a switch, includes: confirming whether or not a flow notified from a controller conforms with a predetermined function to determine whether the flow is a valid flow or an invalid flow; registering the valid flow on a normal flow table; registering the invalid flow on a save flow table; and recognizing a packet received from a network as a flow and carrying out processing specified to the flow to the packet when the flow has been registered on the normal flow table.

A flow table control program of the present invention is a program for making a switch execute: confirming whether or not a flow notified from a controller conforms with a predetermined function to determine whether the flow is a valid flow or an invalid flow; registering the valid flow on a normal flow table; registering the invalid flow on a save flow table; and recognizing a packet received from a network as a flow and carrying out processing specified to the flow to the packet when the flow has been registered on the normal flow table. It should be noted that the flow table control program of present invention can be stored in a storage unit and a storage medium.

In this way, the controller can determine whether or not the flow could be registered on the flow table of the switch.

DESCRIPTION OF EXEMPLARY EMBODIMENTS

Hereinafter, an open flow system implemented with a save flow table according to the present invention will be described.

[First Exemplary Embodiment]

Hereinafter, a first exemplary embodiment of the present invention will be described with reference to the attached drawings. In the present exemplary embodiment, a basic configuration and operation of the open flow system of the present invention will be described.

(System Configuration)

Figure 1:
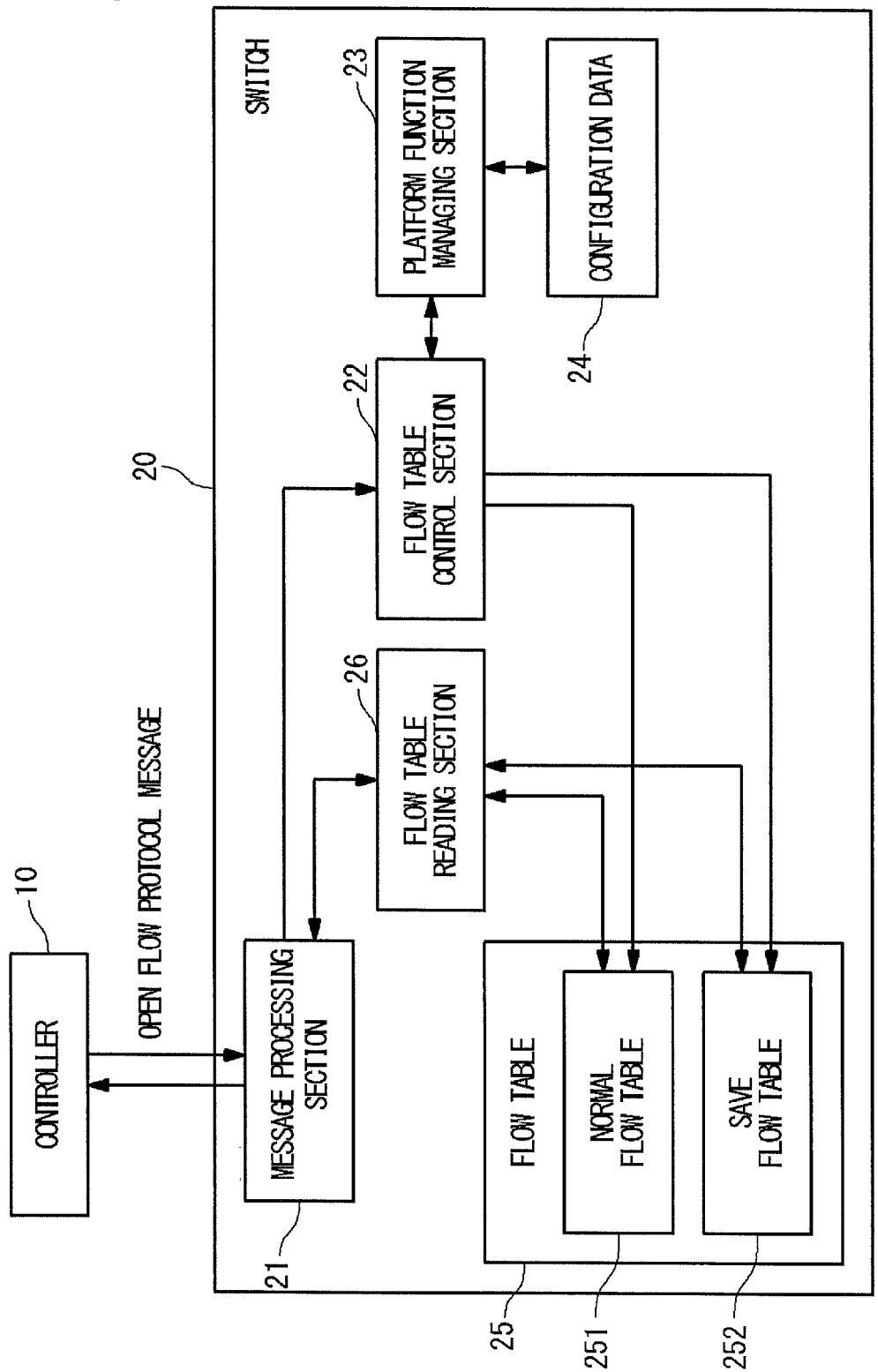
FIG. 1 is a block diagram showing a configuration example of an open flow system of the present invention.

As shown in FIG. 1, the open flow system of the present invention is provided with a controller 10 and a switch 20.

The controller 10 forms one open flow system together with the switch 20 and transmits and receives an open flow protocol message.

The switch 20 is provided with a message processing section 21, a flow table control section 22, a platform function managing section 23, configuration data 24, a flow table 25 and a flow table reading section 26.

The message processing section 21 receives an open flow protocol message from the controller 10, analyzes the message, handles it by an appropriate one of inner modules of switch 20, assembles an open flow protocol message in response to a request from the one inner module and transmits it to the controller 10.

A flow modification (Flow Mod) message and a statistic request message exist as the open flow protocol messages. The flow modification (Flow Mod) message is a message for setting a flow entry to the flow table 25 of the switch 20 (addition, modification, deletion) or for generating the flow table 25. The statistic request message is a message for requesting statistic data of the flow entries, ports and the flow table 25 of the switch 20.

The flow table control section 22 inquires a confirmation of a flow received from the message processing section 21 to the platform function managing section 23 and performs the addition, deletion and modification of the flow entry to the flow table 25 based on the inquiry result.

The platform function managing section 23 determines whether or not the flow as an object is valid or invalid, in response to the inquiry from the flow table control section 22. Here, the platform function managing section 23 refers to the configuration data 24 of the switch 20 to confirm the network (NW) setting, when receiving the inquiry of the flow from the flow table control section 22. That is, the platform function managing section 23 confirms whether or not a rule and an action of the flow as the object conform to the configuration data 24 of the switch 20.

The configuration data 24 is set in advance and is maintained or retained in the switch 20. As an example of the configuration data 24, data of a node configuration in the network (NW) to which the switch 20 belongs, data of functions which the switch 20 has and so on are exemplified.

The flow table 25 has a normal flow table 251 and a save flow table 252.

The normal flow table 251 is a flow table used to register a valid flow conforming to the configuration data 24 of the switch 20.

The save flow table 252 is a flow table used to register an invalid flow which does not conform to the configuration data 24 of the switch 20.

The flow table reading section 26 generates a search key based on data of a header region of the flow received from the message processing section 21, searches one flow entry in the flow table 25 based on the search key and reads the searched flow entry.

In this example, the message processing section 21 receives a packet from the network, notifies a flow which is based on the packet, to the flow table reading section 26, and transfers the flow according to a flow entry if there is the flow entry corresponding to the flow in the normal flow table 251. Also, the message processing section 21 notifies the flow to the controller 10 if there is not any flow entry corresponding to the flow in the normal flow table 251.

At this time, it is desirable that a communication line for the message processing section 21 to communicate with the network and a communication line for the message processing section 21 to communicate with the controller 10 are different communication lines. However, actually, it is possible to use the same communication line.

(Exemplification of Hardware)

As an example of the controller 10, computers such as a PC (personal computer), an appliance (appliance), a work station, a mainframe, and a supercomputer are exemplified. Also, the controller 10 may be under a virtual machine (VM) environment built on a physical machine.

As an example of the switch 20, a network switch is exemplified. The network switch may be an L3 switch (layer 3 switch), an L4 switch (layer 4 switch), an L7 switch/application switch (layer 7 switch) or a multi-layer switch and so on. Besides, as an example of the switch 20, a router, a proxy, a gateway, a fire wall, a load balancer, a band control unit, a security monitoring and controlling unit, a base station, an access point, a computer which has a plurality of communication ports and so on are exemplified.

The message processing section 21, the flow table control section 22, the flow table reading section 26, the platform function managing section 23 are realized by a hardware resource such as a processor driven by a program, a software resource such as a program to drive the hardware resource to execute a desired process, and a memory which stores the software resource and various kinds of data. The flow table 25 and the configuration data 24 are supposed to be stored in the above-mentioned memory. As an example of the above-mentioned hardware resource, a CPU (Central Processing Unit), a microprocessor (microprocessor), a microcontroller, a semiconductor integrated circuit (IC) which has a function of an exclusive use, and so on are exemplified.

As an example of the above-mentioned memory, a RAM (Random Access Memory), a ROM (Read Only Memory), semiconductor memory devices such as an EEPROM (Electrically Erasable and Programmable Read Only Memory) and a flash memory, secondary memories such as HDD (Hard Disk Drive) and SSD (Solid State Drive), or a removable disk, a storage medium (media) and so on for DVD (Digital Versatile Disk) and SD (Secure Digital) memory card and so on are exemplified. Also, the above-mentioned memory may be a storage unit which uses DAS (Direct Attached Storage), FC-SAN (Fibre Channel—Storage Area Network), NAS (Network Attached Storage), IP-SAN (IP—Storage Area Network), and so on.

Also, the above-mentioned hardware resource and the above-mentioned memory may be unified. For example, in recent years, a 1-chip device such as a microcomputer is developed. Therefore, a case that the 1-chip microcomputer mounted on the switch 20 is provided with a processor and a storage unit is exemplified.

However, actually, the present invention is not limited to these examples.

(Setting Processing onto Flow Table)

Figure 2:
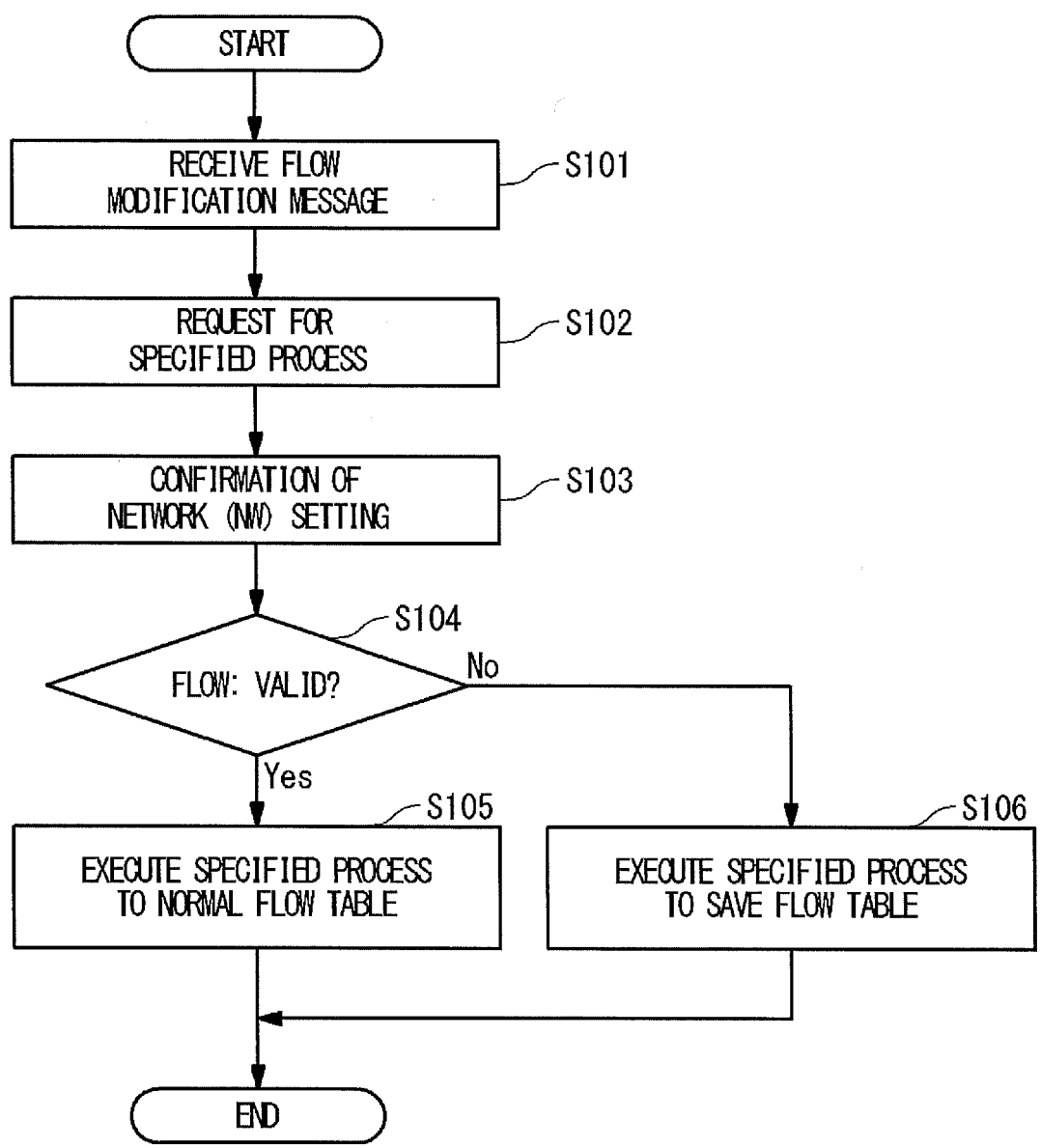
FIG. 2 is a flow chart showing processing when a flow entry is set on a flow table.

The processing when setting a flow entry onto the flow table 25 will be described with reference to FIG. 2.

(1) Step S101

The message processing section 21 receives a flow modification (Flow Mod) message as an open flow protocol message from the controller 10. At this time, the message processing section 21 may determine a type of the open flow protocol message received from the controller 10.

(2) Step S102

The message processing section 21 requests the processing specified in the flow modification (Flow Mod) message to the flow table control section 22 in response to the flow modification (Flow Mod) message. Here, the processing specified in the flow modification (Flow Mod) message is either of the addition, the deletion and the modification of the flow entry.

(3) Step S103

The flow table control section 22 requests the confirmation of the network (NW) setting for the flow shown in the flow modification (Flow Mod) message to the platform function managing section 23. At this time, the flow table control section 22 may start the platform function managing section 23.

(4) Step S104

The platform function managing section 23 refers to the configuration data 24 of the switch 20 to confirm the network (NW) setting, determines whether the flow is valid or invalid, and returns the confirmation result of the network (NW) setting (the determination result) to the flow table control section 22.

(5) Step S105

The flow table control section 22 performs the processing specified in the flow modification (Flow Mod) message (i.e. either of the addition, deletion and modification of the flow entry) to the normal flow table 251, when the flow is determined to be valid, as the confirmation result of the network (NW) setting.

(6) Step S106

The flow table control section 22 performs the processing specified in the flow modification (Flow Mod) message (either of the addition, deletion and modification of the flow entry) to the save flow table 252, when the flow is determined to be invalid as the confirmation result of the network (NW) setting.

It should be noted that the flow table control section 22 may instruct the deletion of the flow entry to both of the normal flow table 251 and the save flow table 252 sequentially or simultaneously without requesting the confirmation of the network (NW) setting to the platform function managing section 23, when the deletion of a flow entry is executed based on the flow received from the message processing section 21. This is because the network (NW) setting is changed or modified after the flow entry is registered into either of the normal flow table 251 and the save flow table 252, so that there is a possibility that the confirmation results (the determination result) of the network (NW) setting are different between the time of the registration of the flow entry and the time of the deletion.

(Registration onto Normal Flow Table)

Figure 3:
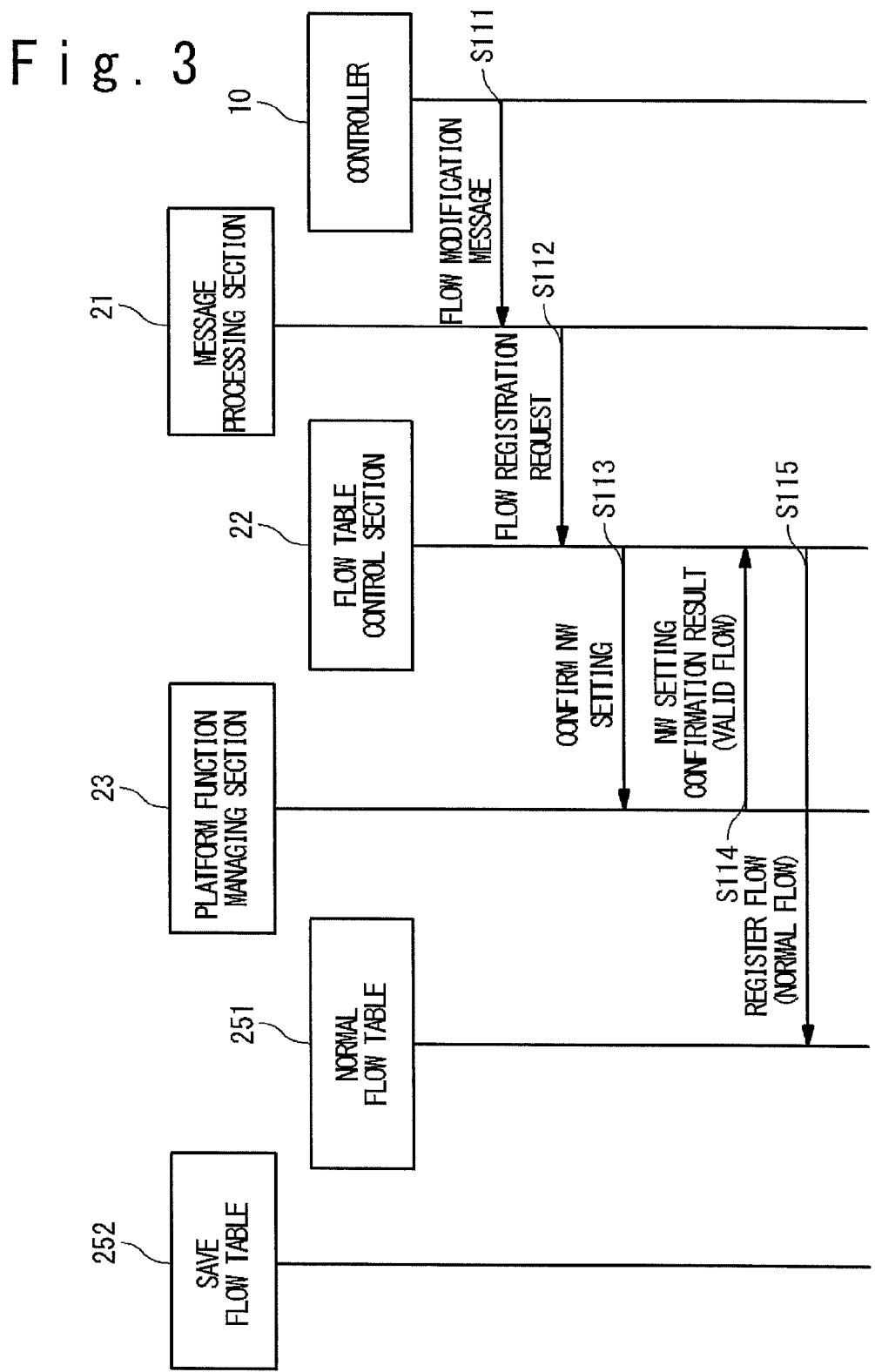
FIG. 3 is a sequence chart showing processing when a flow notified from a controller conforms to the configuration data of a switch and is registered on a normal flow table.

The processing when the flow notified from the controller 10 conforms to the configuration data 24 of the switch 20 and is registered on the normal flow table will be described with reference to FIG. 3.

(1) Step S111

First, the controller 10 transmits a flow modification (Flow Mod) message to the message processing section 21 to instruct the registration of the flow.

(2) Step S112

The message processing section 21 requests the flow registration to the flow table control section 22 in response to the flow modification (Flow Mod) message.

(3) Step S113

The flow table control section 22 requests the network (NW) setting confirmation to the platform function managing section 23 for the flow which is shown in the flow modification (Flow Mod) message.

(4) Step S114

The platform function managing section 23 refers to the configuration data 24 of the switch 20 to confirm the network (NW) setting, and returns the network (NW) setting confirmation result to the flow table control section 22. Here, it is supposed that the network (NW) setting confirmation result shows that the flow is valid.

(5) Step S115

The flow table control section 22 registers the flow entry to the flow on the normal flow table 251 when the flow is valid.

(Registration onto Save Flow Table)

Figure 4:
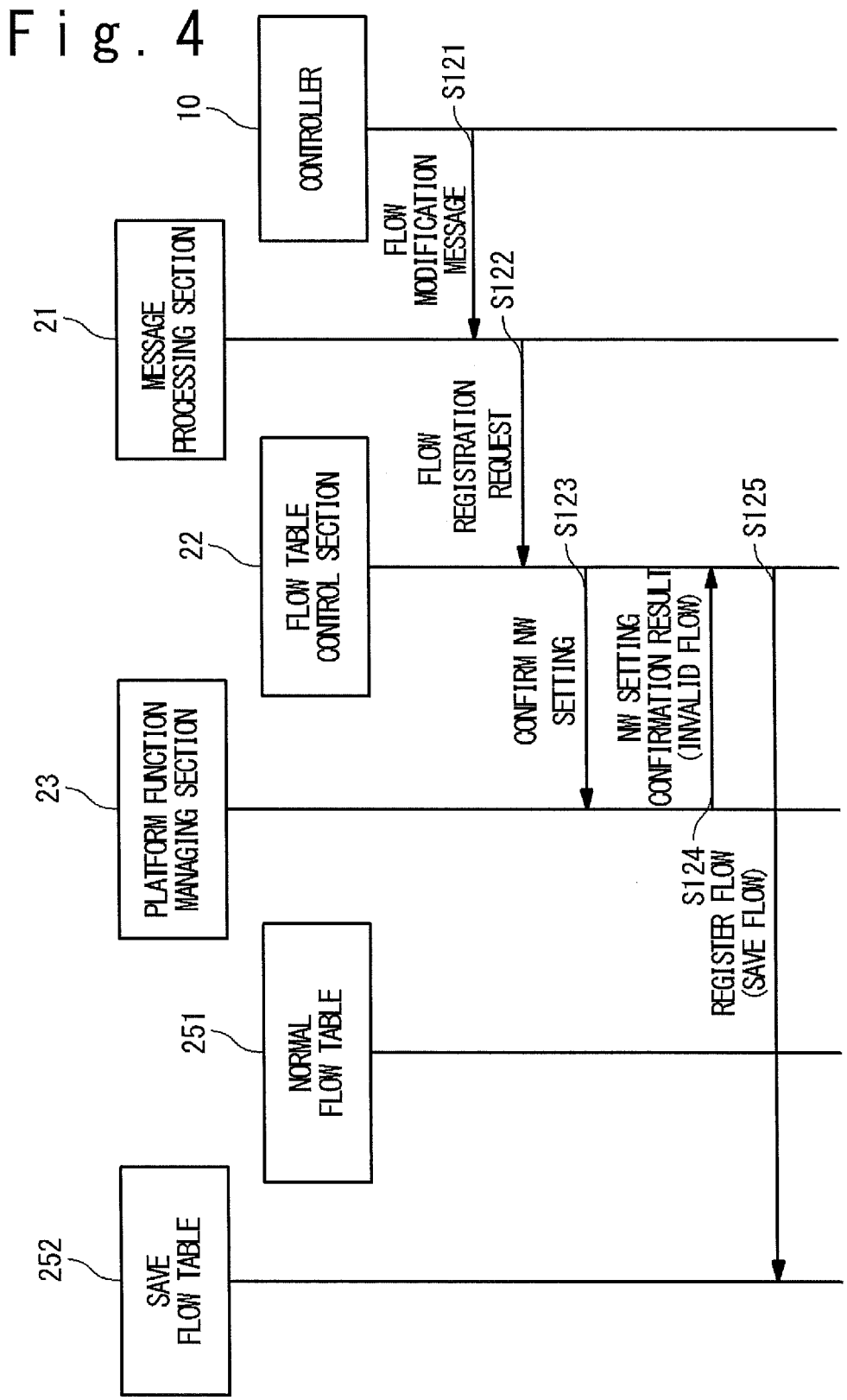
FIG. 4 is a sequence chart showing processing when a flow notified from a controller does not conform to the configuration data of the switch and is registered on a save flow table.

The processing that the flow notified from the controller 10 and not conforming with the configuration data 24 of the switch 20, is registered onto the save flow table will be described with reference to FIG. 4.

(1) Step S121

First, the controller 10 transmits the flow modification (Flow Mod) message to the message processing section 21 to instruct the flow registration.

(2) Step S122

The message processing section 21 requests the flow registration to the flow table control section 22 in response to the flow modification (Flow Mod) message.

(3) Step S123

The flow table control section 22 requests the confirmation of network (NW) setting to the platform function managing section 23 for the flow which is shown in the flow modification (Flow Mod) message.

(4) Step S124

The platform function managing section 23 refers to the configuration data 24 of the switch 20 to confirm the network (NW) setting, and returns the confirmation result of the network (NW) setting to the flow table control section 22. Here, it is supposed that the confirmation result of the network (NW) setting shows that the flow is invalid.

(5) Step S125

The flow table control section 22 registers the entry of the flow on the save flow table 252 when the flow is invalid.

(Read Processing from Flow Table)

The processing when a flow entry is read from the flow table 25 will be described with reference to FIG. 5.

(1) Step S201

The message processing section 21 receives a statistic request (Statistics Request) message as one open flow protocol message from the controller 10. At this time, the message processing section 21 may determine a type of the open flow protocol message received from the controller 10.

(2) Step S202

The message processing section 21 requests a flow condition read for the flow which is shown in the statistic request message, to the flow table reading section 26. Here, the message processing section 21 notifies the flow to the flow table reading section 26. At this time, the message processing section 21 may start the flow table reading section 26.

(3) Step S203

The flow table reading section 26 confirms the flow condition in response to the flow condition read request. Here, the flow table reading section 26 generates a search key based on the data of the header region of the flow, and searches the normal flow table 251 based on this search key to confirm the existence or non-existence of the corresponding flow entry in the normal flow table 251.

(4) Step S204

If there is a corresponding flow entry in the normal flow table 251, the flow table reading section 26 confirms based on the flow condition confirmation result that there is the corresponding flow entry in the normal flow table 251.

(5) Step S205

If there is not the corresponding flow entry in the normal flow table 251, the flow table reading section 26 confirms that there is not any corresponding flow entry in the normal flow table 251, from the flow condition confirmation result.

(6) Step S206

When there is not any corresponding flow entry in the normal flow table 251, the flow table reading section 26 generates a search key based on the data of the header region of the flow, and searches the save flow table 252 based on this search key to confirm the existence or non-existence of the corresponding flow entry in the save flow table 252.

(7) Step S207

If there is any corresponding flow entry in the save flow table 252, the flow table reading section 26 confirms that there is the corresponding flow entry in the save flow table 252, based on the flow condition confirmation result.

(8) Step S208

If there is not any corresponding flow entry in the save flow table 252, the flow table reading section 26 confirms that there is not the corresponding flow entry in the save flow table 252, based on the flow condition confirmation result. In this case, it is proved that the flow is an unregistered flow which is registered on neither of the normal flow table 251 or the save flow table 252.

(9) Step S209 The flow table reading section 26 notifies a flow condition reading result to the message processing section 21 based on the flow condition confirmation result. For example, when there are a plurality of flows, the flow table reading section 26 notifies the flow condition reading result to the message processing section 21, after completing the flow condition confirmation to all of the flows.

(10) Step S210

The message processing section 21 generates a statistical replying (Statistics Reply) message based on the flow condition reading result and transmits it to the controller 10.

(Read Processing from Normal Flow Table)

Figure 6:
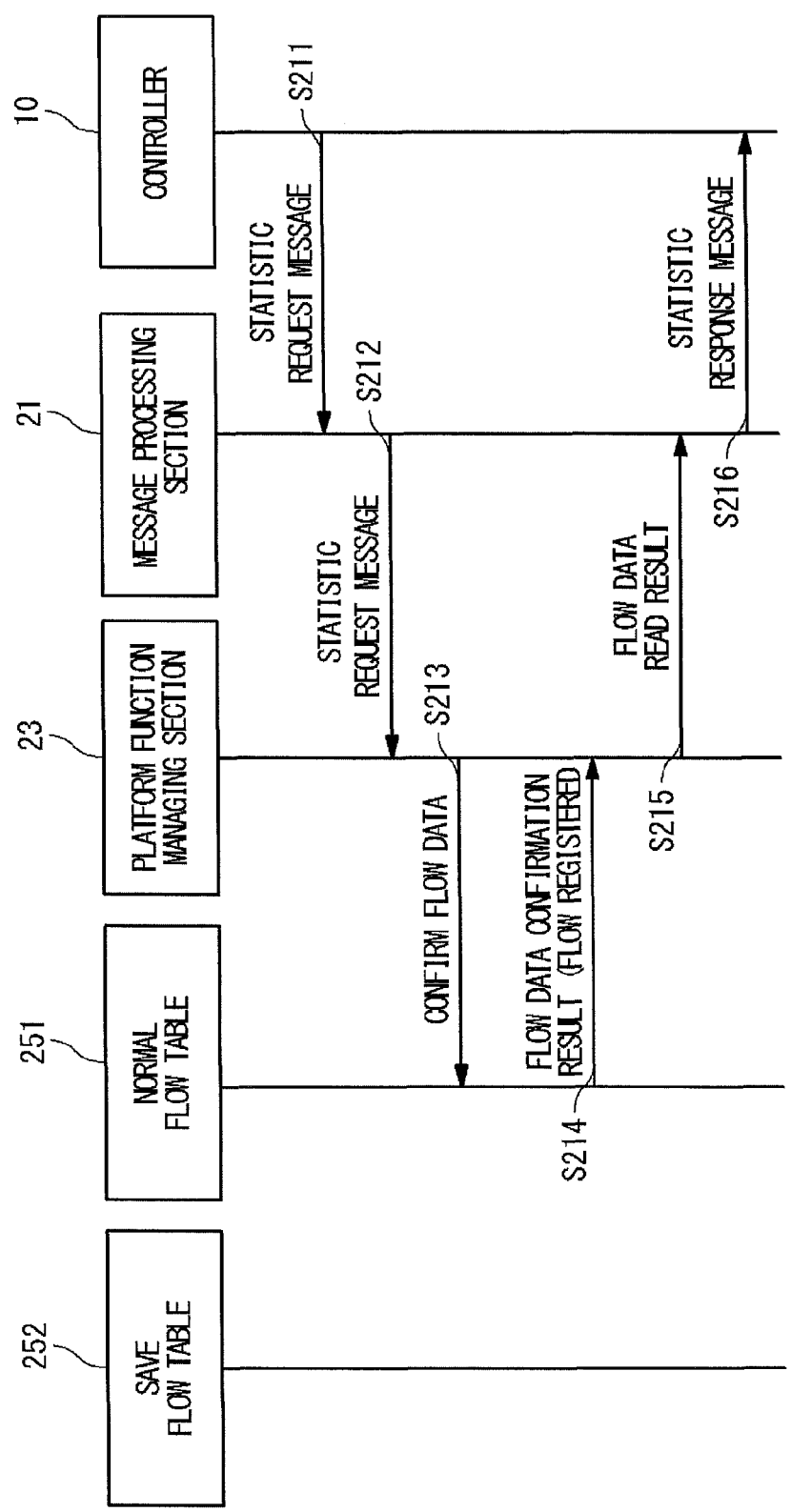
FIG. 6 is a sequence chart showing processing when a flow entry corresponding to the flow requested from the controller is read from a normal flow table.

The processing when the flow entry corresponding to the flow requested from the controller 10 is read from the normal flow table 251 will be described with reference to FIG. 6.

(1) Step S211

First, the controller 10 transmits a statistic request (Statistics Request) message to the message processing section 21.

(2) Step S212

The message processing section 21 issues a flow condition read request to the flow table reading section 26 based on the flow which is contained or shown in the statistics request message.

(3) Step S213

The flow table reading section 26 searches the normal flow table 251 based on the flow to confirm a flow condition of the existence or non-existence of the corresponding flow entry. Here, it is supposed that there is the corresponding flow entry in the normal flow table 251.

(4) Step S214

The flow table reading section 26 confirms that there is the corresponding flow entry in the normal flow table 251, as the flow condition confirmation result.

(5) Step S215

After that, the flow table reading section 26 notifies a flow condition reading result to the message processing section 21.

(6) Step S216

The message processing section 21 generates and transmits a statistics reply message to the controller 10.

(Read Processing from Save Flow Table)

Figure 7:
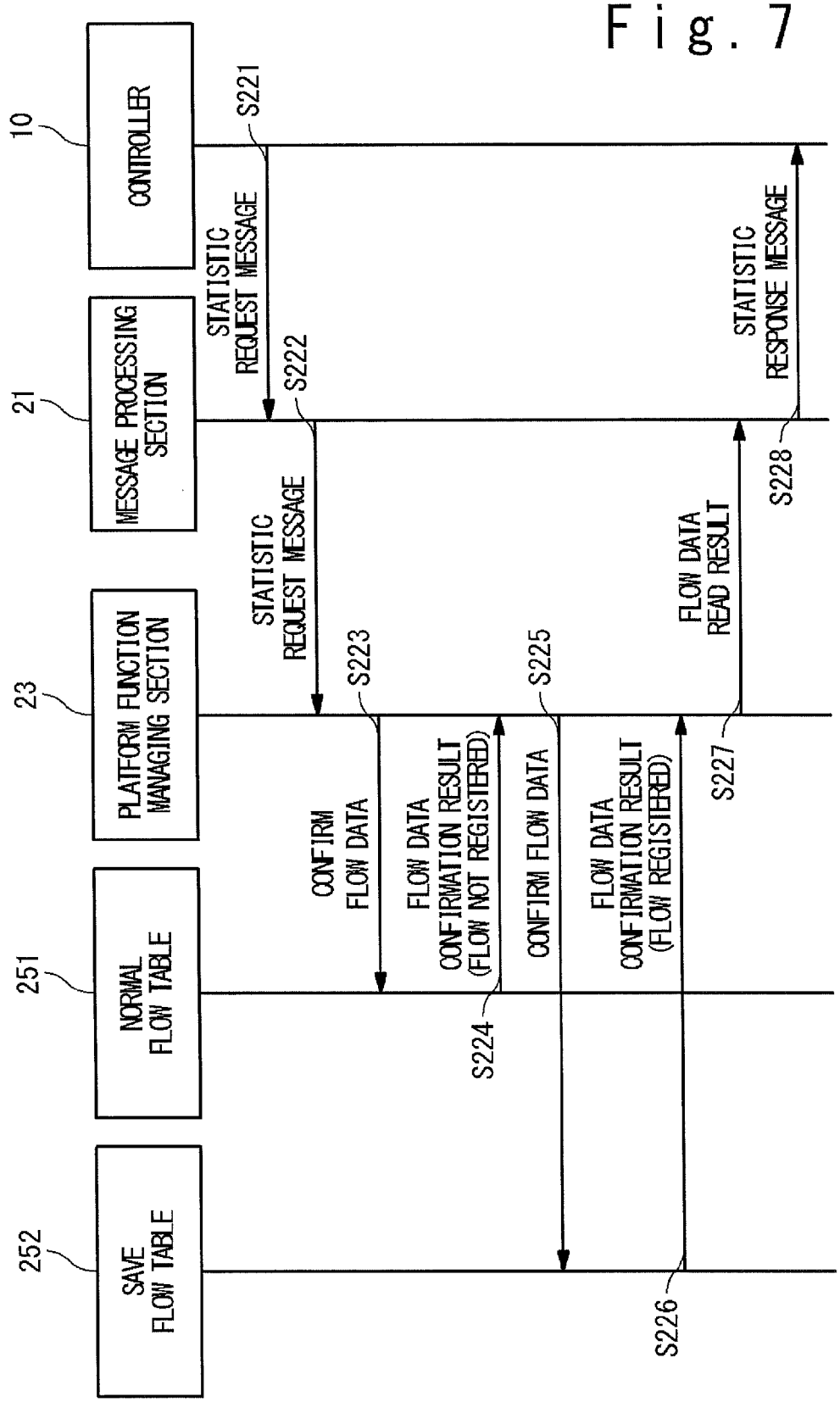
FIG. 7 is a sequence chart showing processing when the flow entry corresponding to the flow requested from the controller is read from the save flow table.

The processing when the flow entry corresponding to the flow requested from the controller 10 is read from the save flow table 252 will be described with reference to FIG. 7.

(1) Step S221

First, the controller 10 transmits a statistics request message to the message processing section 21.

(2) Step S222

The message processing section 21 issues a flow condition read request to the flow table reading section 26 based on the flow which is shown in the statistics request message.

(3) Step S223

The flow table reading section 26 searches the normal flow table 251 based on the flow to confirm a flow condition of the existence or non-existence of the corresponding flow entry. Here, it is supposed that there is not the corresponding flow entry in the normal flow table 251.

(4) Step S224

The flow table reading section 26 confirms that there is not the corresponding flow entry in the normal flow table 251, as the flow condition confirmation result.

(5) Step S225

Next, the flow table reading section 26 searches the save flow table 252 based on the flow to confirm a flow condition of the existence or non-existence of the corresponding flow entry. Here, it is supposed that there is the corresponding flow entry in the save flow table 252.

(6) Step S226

The flow table reading section 26 confirms that there is the corresponding flow entry in the save flow table 252, as the flow condition confirmation result.

(7) Step S227

After that, the flow table reading section 26 notifies the flow condition reading result to the message processing section 21.

(8) Step S228

The message processing section 21 generates and transmits a statistics reply message to the controller 10.

By this, the controller 10 can confirm success or failure of the registration of a flow on the flow table 25, by only transmitting the statistics request message.

For example, after requesting the registration processing of a flow to the flow table 25 to the switch 20, the controller 10 transmits the statistics request message of the flow to the switch 20 in order to confirm whether or not the flow entry corresponding to the flow has succeeded in the registration on the flow table 25. The controller 10 can confirm whether the registration of the flow entry onto the flow table 25 has succeeded or failed, by the statistics reply message from the switch 20.

[Second Exemplary Embodiment]

Next, the second exemplary embodiment of the present invention will be described.

In the present exemplary embodiment, after the registration onto the flow table, whether or not the flow shown by the flow entry in the flow table is valid or invalid is reconfirmed.

(Reconfirmation Processing of Validity of Flow Entry)

The processing of reconfirming whether the flow shown by the flow entry is valid or invalid will be described with reference to FIG. 8.

(1) Step S301

When the configuration data 24 of the switch 20 is modified, the platform function managing section 23 notifies it to the flow table control section 22. When receiving the notice from the platform function managing section 23, the flow table control section 22 notifies the received notice to the message processing section 21. That is, when the configuration data 24 of the switch 20 is modified or changed, the platform function managing section 23 notifies it to the message processing section 21 directly or through the flow table control section 22.

(2) Step S302

The message processing section 21 requests the read of all the flow entries which are registered on the normal flow table 251 and the save flow table 252, to the flow table reading section 26.

(3) Step S303

The flow table reading section 26 reads all the flow entries which are registered on the normal flow table 251 and the save flow table 252 in response to the request from the message processing section 21 and notifies to the message processing section 21. It should be noted that actually, the flow table reading section 26 may perform the reading operation of the flow entries in the normal flow table 251 and the reading operation of the flow entries in the save flow table 252 not collectively but separately (independently). In this case, the flow table reading section 26 notifies the flow entries in the normal flow table 251 and the flow entries in the save flow table 252 to the message processing section 21 separately.

(4) Step S304

The message processing section 21 notifies all the flows shown by the flow entries which have notified from the flow table reading section 26, to the flow table control section 22.

(5) Step S305

The flow table control section 22 requests the confirmation of the network (NW) setting for all the flows corresponding to the flow entries which have been notified from the message processing section 21, to the platform function managing section 23. At this time, the flow table control section 22 may start the platform function managing section 23.

(6) Step S306

The platform function managing section 23 refers to the configuration data 24 of the switch 20 to confirm the network (NW) setting, determines whether each flow is valid or invalid, and returns the network (NW) setting confirmation result (the determination result) to the flow table control section 22.

(7) Step S307

If the object flow is a valid flow as the result of the network (NW) setting confirmation, the flow table control section 22 executes the addition and modification of the flow entry to the normal flow table 251.

(8) Step S308

Moreover, if the object flow is one registered on the save flow table 252, the flow table control section 22 deletes the flow entry from the save flow table 252. If the object flow is not the one registered on the save flow table 252, this operation is not performed.

(9) Step S309

Also, if the object flow is an invalid flow as the result of the network (NW) setting confirmation, the flow table control section 22 performs the addition or modification of the flow entry to the save flow table 252.

(10) Step S310

Moreover, if the object flow is the one registered on the normal flow table 251, the flow table control section 22 deletes the flow entry from the normal flow table 251. If the object flow is not the one registered on the normal flow table 251, this operation is not performed.

Here, it is supposed that it is known that the object flow is derived from which of the flow entry in the normal flow table 251 and the flow entry in the save flow table 252. For example, a case where the flow is related to data indicating that the flow is derived from or registered in which of flow tables is thought of. Or, a case where the processing to the flow entry in the normal flow table 251 and the processing to the flow entry in the save flow table 252 is performed separately (independent) is thought of.

Also, even though it is not determined that the object flow is derived from either of the flow entry in the normal flow table 251 and the flow entry in the save flow table 252, the overlap registration can be avoided, if the already registered flow entries are deleted in advance before the object flow is re-registered on either of the normal flow table 251 and the save flow table 252. For example, the flow table control section 22 generates a search key based on data of the header region of the object flow before the object flow is re-registered on the flow table after the flow is notified from the message processing section 21, searches each flow table based on this search key, and deletes corresponding flow entry in advance. Or, not in units of flow entries but the existing flow tables 25 (the normal flow table 251 and the save flow table 252) may be initialized and deleted in advance, and the normal flow table 251 and the save flow table 252 may be newly generated in advance once more.

Moreover, the processing of the addition and modification of the flow entry of the registration object to the flow table may be performed unconditionally without determining that the object flow is derived from which of the flow entry in the normal flow table 251 and the flow entry in the save flow table 252, and otherwise, the processing of the deletion of the flow entry may be performed. Even if the flow entry corresponding to the object flow does not exist in the flow table to which the deletion processing of the flow entry has been performed, the deletion processing of the flow entry fails only.

In this way, when a modification is applied to the configuration data 24, the switch 20 can reconfirm whether or not each of all the flow entries registered in the flow table 25 conforms to the configuration data 24, without receiving an instruction from the controller 10.

According to the present exemplary embodiment, the controller 10 can automatically change or modify an invalid flow to a valid flow when the configuration data 24 is changed or modified by registering the invalid flow on the flow table 25 of the switch 20 in advance. Thus, the flow table 25 of the switch 20 can be made redundant.

[Third Exemplary Embodiment]

Next, a third exemplary embodiment of the present invention will be described.

In the present exemplary embodiment, reconfirmation processing of the validity of the flow entry is performed periodically or when a new flow is notified, as well as a case where a modification is applied to the configuration data 24 of the switch 20 in "the reconfirmation processing of the validity of the flow entry" shown in the second exemplary embodiment.

Figure 8:
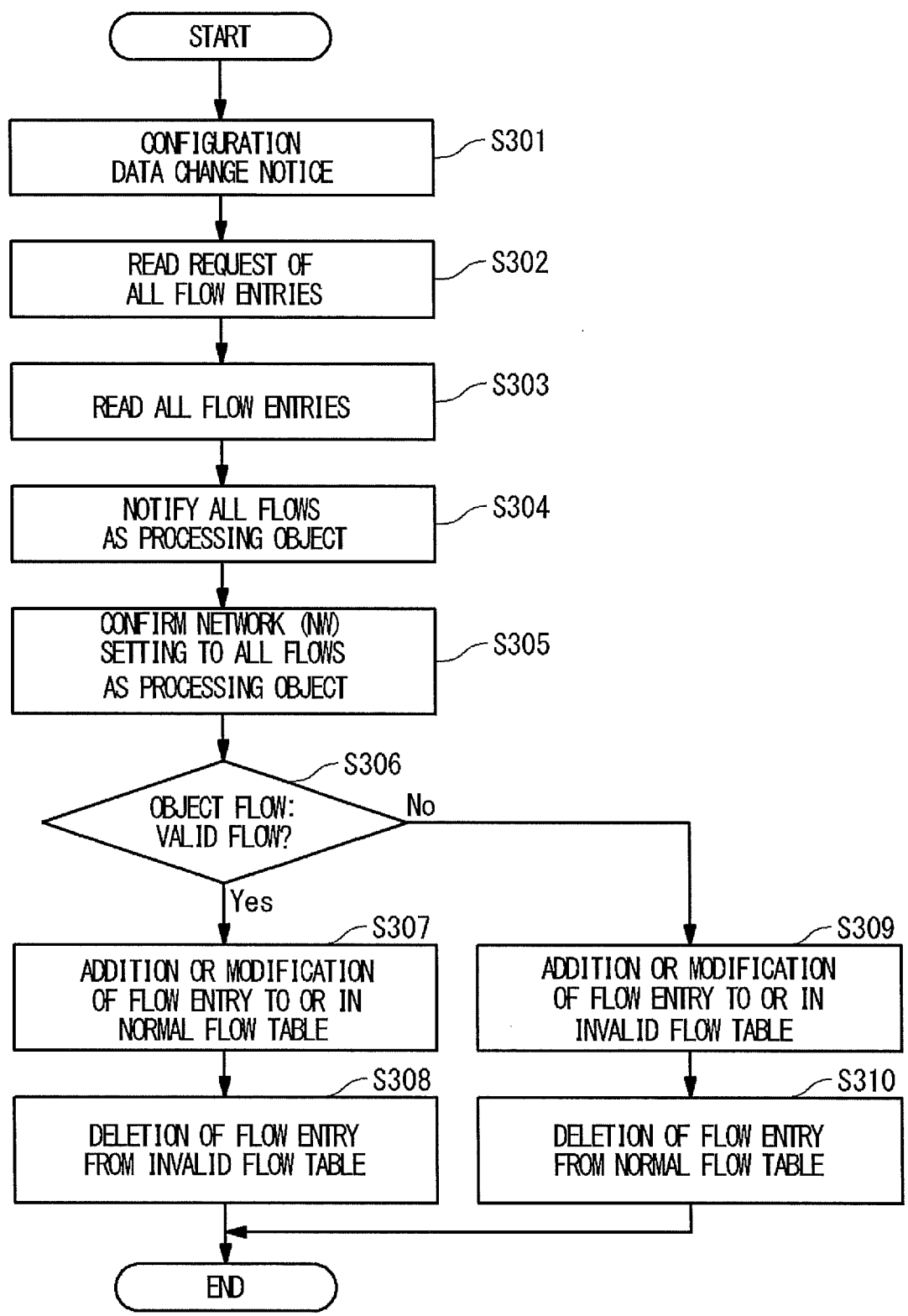
FIG. 8 is a flow chart showing processing when whether a flow shown in a flow entry is valid or invalid is re-confirmed.

For example, the processing of the step S302 and the subsequent is performed at a predetermined time of every day or when receiving a flow modification (Flow Mod) message from the controller 10, not when receiving a notice from the platform function managing section 23 at the step S301 shown in FIG. 8.

According to the present exemplary embodiment, even if the modification of the configuration data 24 is not detected, the modification of the configuration data 24 can be dealt. That is, the modification of the configuration data 24 is not detected immediately, and when reconfirming, the modification of the configuration data 24 is recognized ex post facto.

[Fourth Exemplary Embodiment]

Next, a fourth exemplary embodiment of the present invention will be described.

In the present exemplary embodiment, "the reconfirmation processing of the validity of the flow entry" shown in the second exemplary embodiment is performed immediately after "the read processing from the flow table" shown in the first exemplary embodiment.

Figure 5:
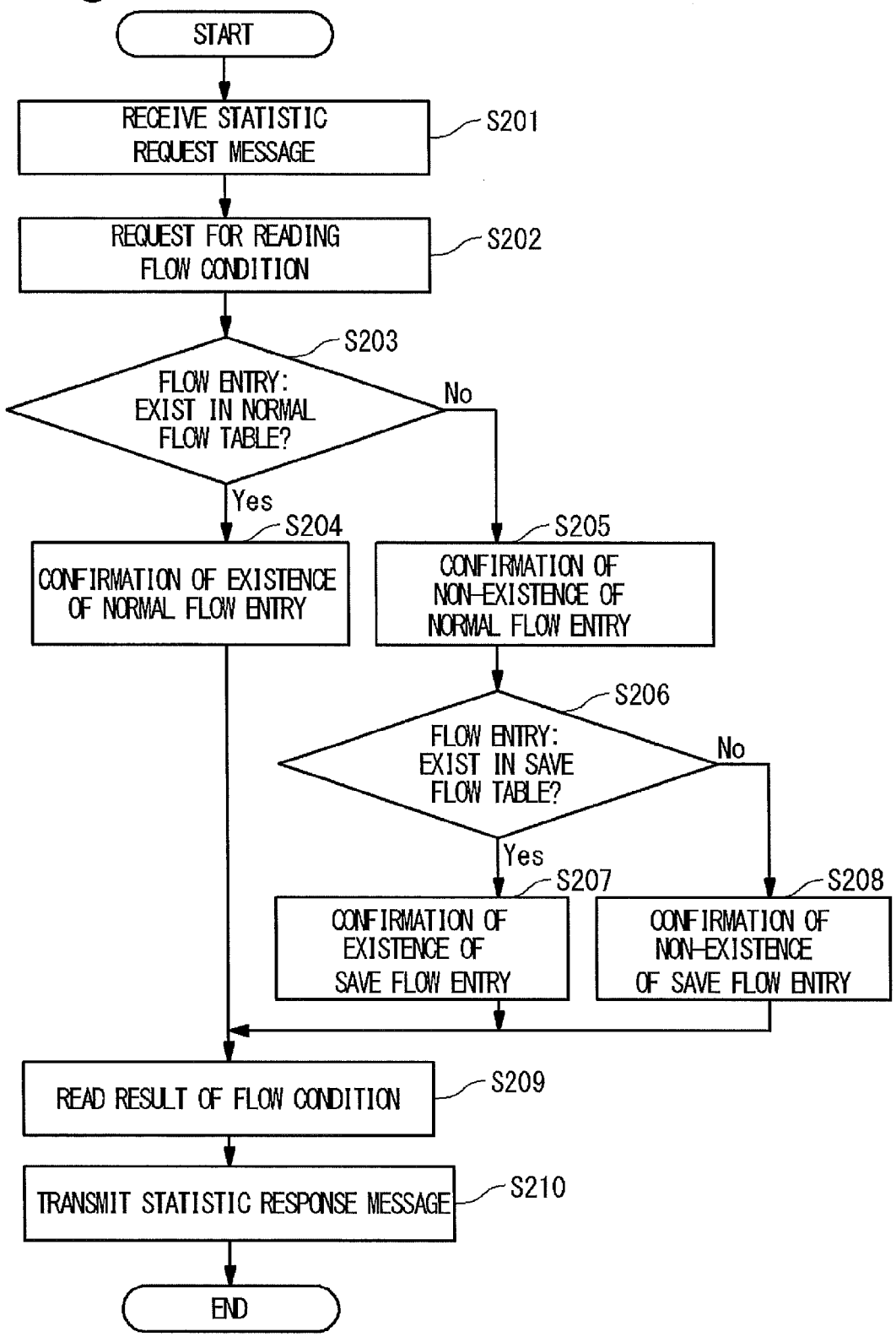
FIG. 5 is a flow chart showing processing when a flow entry is read from the flow table.

For example, processing of the step S305 and the subsequent shown in FIG. 8 is performed immediately after the step S210 shown in FIG. 5, or between the step S209 and the step S210.

[Fifth Exemplary Embodiment]

Next, a fifth exemplary embodiment of the present invention will be described.

In the present exemplary embodiment, "the reconfirmation processing of the validity of the flow entry" shown in the second exemplary embodiment may be performed by using the flow shown in the statistics request message as the object flow before starting a read from the flow table in "the read processing from the flow table" shown in the first exemplary embodiment.

For example, the message processing section 21 notifies to the flow table control section 22 by using the flow shown in the statistics request message as the object flow between the step S201 and the step S202 shown in FIG. 5. After that, the processing of the step S306 and the subsequent shown in FIG. 8 is performed.

In this case, the flow table control section 22 does not know that the object flow is registered on which of the flow tables in the step S308 to the step S311. Therefore, the flow table control section 22 generates a search key based on data in the header region of the object flow before re-registering the object flow in each flow table, searches each flow table by using the reference key, and deletes corresponding flow entry in advance. Or, the flow table control section 22 performs the addition and modification of the flow entry corresponding to the object flow to the flow table of the registration object unconditionally and performs the deletion of the flow entry to the other flow table.

[Sixth Exemplary Embodiment]

Next, a sixth exemplary embodiment of the present invention will be described.

In the present exemplary embodiment, when a fault happens, the flow entry of the save table is made valid.

For example, when the fault happens, the message processing section 21 instructs the flow table reading section 26 to read the flow entry of the save flow table 252 and receives a notice of the flow entry of the save flow table 252 from the flow table reading section 26. The message processing section 21 instructs the flow table control section 22 to perform the addition of the flow entry to the normal flow table 251 and the deletion of the flow entry from the save flow table 252 with respect to the flow shown in the flow entry. The flow table control section 22 performs the addition of the flow entry to the normal flow table 251 and the deletion of the flow entry from the save flow table 252 in response to the instruction from the message processing section 21.

It should be noted that because there is a case that a modification occurs in the configuration data 24 of the switch 20 when a fault occurs, a case where "the reconfirmation processing of the validity of the flow entry" in the second exemplary embodiment is dealt with is thought of.

<Relation of Exemplary Embodiments>

It should be noted that the above-mentioned exemplary embodiments can be combined.

<Summary>

As mentioned above, the present invention provides an open flow system using a save flow table.

The switch in the open flow system of the present invention is to retain a flow entry which does not conform to a predetermined function as an invalid entry. The flow table which retains the invalid entry is referred to as a save flow table. That is, the switch in the open flow system of the present invention is provided with a normal flow table registered with a flow which conforms to the platform function of the switch, and the save flow table registered with a flow which does not conform to the platform function of the switch. Thus, the controller can confirm which flow entry is invalid, by using the statistics request (Statistics Request) message.

The controller in the open flow system of the present invention can confirm flows succeeded and failed in the registration only by transmitting a statistics request (Statistics Request) message. Also, the controller can determine whether or not the flow to be registered on the flow table of the switch could be actually registered.

Also, when a fault happens, it is possible to provide the open flow system with redundancy, by setting a flow entry in the save table to be valid.

<Supplemental Items>

A part or all of the above-mentioned exemplary embodiments can be described like the following adding. However, actually, the present invention is not limited to the following examples.

(Supplemental Item 1)

A flow table control program includes: a step of confirming whether or not a flow notified from the controller conforms with a predetermined function to determine whether the flow is a valid flow or an invalid flow; a step of registering the valid flow on the normal flow table; a step of registering the invalid flow on the save flow table; and a step of recognizing a packet received from the network as the flow, and carrying out the processing specified to the flow to the packet when the flow is registered on the normal flow table.

(Supplemental Item 2)

The flow table control program defined in Supplemental item 1, further includes: a step of reading a flow from either of the normal flow table and the save flow table in response to an inquiry of success or failure of flow registration from the controller; and a step of responding that the flow is registered on which of the normal flow table and the save flow table to the controller.

(Supplemental item 3)

The flow table control program defined in Supplemental item 1 or 2, further includes: a step of detecting a modification of the predetermined function; a step of confirming whether each of the flows registered on the normal flow table and the save flow table conforms with the predetermined function based on the modification of the predetermined function to determine whether or not each flow is a valid flow or an invalid flow; a step of registering the valid flow on the said normal flow table; a step of deleting from the save flow table when the valid flow is registered on the save flow table; a step of registering the invalid flow on the save flow table; and a step of deleting from the normal flow table when the invalid flow is registered on the normal flow table.

As described above, the exemplary embodiments of the present invention have been described in detail. However, actually, the present invention is not limited to the above-mentioned exemplary embodiments and a modification in the range which does not deviate from the scope of the present invention is contained in the present invention.

<Remarks>

The present application claims a priority based on Japan Patent Application number JP 2010-095760. The disclosure thereof is incorporated herein by reference.

The invention claimed is:

1. A switch comprising:
a flow table including a normal flow table and a save flow table;
means for setting a rule and a flow entry to the flow table in response to a control by a controller, wherein the rule is for controlling a packet as a flow, and the flow entry is for defining a processing;
means for confirming whether or not a flow notified from the controller conforms to a function of the switch and determining whether or not the flow is valid or invalid;
means for registering a valid flow on the normal flow table;
means for registering an invalid flow on the save flow table in order to retain a flow entry which does not conform to the function of the switch;
means for recognizing a packet received from a network as a flow and performing processing specified for the flow to the packet when the flow has been registered on the normal flow table;
means for reading the flow from either of the normal flow table and the save flow table in response to an inquiry of success or failure of flow registration from the controller; and
means for responding that the flow is registered on which of the normal flow table and the save flow table, to the controller.

2. The switch according to claim 1, further comprising:
means for detecting a modification of the function;
means for confirming whether or not each of the flows registered on the normal flow table and the save flow table conforms to the function, based on a modification of the function, and determining whether each flow is valid flow or an invalid flow;
means for registering the valid flow on the normal table;
means for deleting the valid flow from the save flow table when the valid flow has been registered on the save flow table;
means for registering the invalid flow on the save flow table; and
means for deleting the invalid flow from the normal flow table when the invalid flow has been registered on the normal flow table.

3. The switch according to claim 1, further comprising:
means for validating a flow which has been registered on the save flow table when a fault occurs.

4. A flow table controlling method by a switch, comprising:
setting a rule and a flow entry to a flow table in response to a control by a controller, wherein the rule is for controlling a packet as a flow, and the flow entry is for defining a processing, the flow table includes a normal flow table and a save flow table;
confirming whether or not a flow notified from the controller conforms to a function of the switch to determine whether the notified flow is a valid flow or an invalid flow;
registering the valid flow on the normal flow table;
registering the invalid flow on the save flow table in order to retain a flow entry which does not conform to the function of the switch;
recognizing a packet received from a network as a flow and carrying out processing specified for the flow to the packet when the flow has been registered on the normal flow table;
reading a flow from either of the normal flow table and the save flow table in response to an inquiry of success or failure of flow registration from the controller; and
replying which of the normal flow table and the save flow table the flow has been registered on, to the controller.

5. The flow table controlling method according to claim 4, further comprising:
detecting a modification of the function;
confirming whether or not each of the flows registered on the normal flow table and the save flow table conforms to the function, based on a modification of the function, and determining whether each flow is valid flow or an invalid flow;
registering the valid flow on the normal table;
deleting the valid flow from the save flow table when the valid flow has been registered on the save flow table;
registering the invalid flow on the save flow table; and
deleting the invalid flow from the normal flow table when the invalid flow has been registered on the normal flow table.

6. A non-transitory storage medium which stores a flow table control program to attain a flow table controlling method by a switch, which comprises:

setting a rule and a flow entry to a flow table in response to a control by a controller, wherein the rule is for controlling a packet as a flow, and the flow entry is for defining a processing, the flow table includes a normal flow table and a save flow table;

confirming whether or not a flow notified from the controller conforms to a function of the switch to determine whether the notified flow is a valid flow or an invalid flow;

registering the valid flow on the normal flow table;

registering the invalid flow on the save flow table in order to retain a flow entry which does not conform to the function of the switch;

recognizing a packet received from a network as a flow and carrying out processing specified for the flow to the packet when the flow has been registered on the normal flow table;

reading a flow from either of the normal flow table and the save flow table in response to an inquiry of success or failure of flow registration from the controller; and replying which of the normal flow table and the save flow table the flow has been registered on, to the controller.

7. The flow table controlling method according to claim 6, further comprising:

detecting a modification of the function;

confirming whether or not each of the flows registered on the normal flow table and the save flow table conforms to the function, based on a modification of the function, and determining whether each flow is valid flow or an invalid flow;

registering the valid flow on the normal table;

deleting the valid flow from the save flow table when the valid flow has been registered on the save flow table;

registering the invalid flow on the save flow table; and deleting the invalid flow from the normal flow table when the invalid flow has been registered on the normal flow table.

8. The switch according to claim 2, further comprising:

means for validating a flow which has been registered on the save flow table when a fault occurs.

* * * * *